(12) United States Patent
Engels et al.

(10) Patent No.: US 9,511,337 B2
(45) Date of Patent: Dec. 6, 2016

(54) METHOD AND APPARATUS FOR EXTRACTING A FIBER OF A WOUND COMPOSITE PART

(71) Applicant: Airbus Operations GmbH, Hamburg (DE)

(72) Inventors: Alexander Engels, Hamburg (DE); Tassilo Witte, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 55 days.

(21) Appl. No.: 14/730,588

(22) Filed: Jun. 4, 2015

(65) Prior Publication Data
US 2015/0273423 A1    Oct. 1, 2015

Related U.S. Application Data

(63) Continuation of application No. PCT/EP2013/075862, filed on Dec. 6, 2013.

(60) Provisional application No. 61/734,388, filed on Dec. 7, 2012.

(30) Foreign Application Priority Data

Dec. 7, 2012   (EP) ..................................... 12196116

(51) Int. Cl.
| | | |
|---|---|---|
| C08J 11/04 | (2006.01) | |
| B01J 6/00 | (2006.01) | |
| B29B 17/02 | (2006.01) | |
| C01B 31/02 | (2006.01) | |
| C03C 3/04 | (2006.01) | |
| C08J 11/12 | (2006.01) | |
| B29B 17/00 | (2006.01) | |
| B29K 105/06 | (2006.01) | |
| B29B 17/04 | (2006.01) | |
| B29K 77/00 | (2006.01) | |
| B29L 9/00 | (2006.01) | |
| B29L 31/00 | (2006.01) | |

(52) U.S. Cl.
CPC ............... *B01J 6/008* (2013.01); *B29B 17/02* (2013.01); *B29B 17/04* (2013.01); *C01B 31/02* (2013.01); *C03C 3/04* (2013.01); *C08J 11/12* (2013.01); *B29B 2017/0496* (2013.01); *B29K 2077/10* (2013.01); *B29K 2105/06* (2013.01); *B29L 2009/00* (2013.01); *B29L 2031/772* (2013.01); *C08J 2377/10* (2013.01); *Y02W 30/622* (2015.05); *Y02W 30/625* (2015.05)

(58) Field of Classification Search
CPC .................................. C08G 64/18; C08G 64/06
USPC .................................... 428/375, 378; 521/40
See application file for complete search history.

(56) References Cited

U.S. PATENT DOCUMENTS

| | | | |
|---|---|---|---|
| 6,048,426 A | 4/2000 | Pratt | |
| 2002/0007543 A1* | 1/2002 | Gebizlioglu | ............. B09B 3/00 29/403.3 |

FOREIGN PATENT DOCUMENTS

| | | |
|---|---|---|
| CN | 101910493 A1 | 12/2010 |
| JP | 2005179135 A | 7/2005 |
| JP | 2008031388 * | 2/2008 |
| JP | 2008285601 A | 11/2008 |
| JP | 2013221132 * | 10/2013 |
| WO | 2009135486 A1 | 11/2009 |

OTHER PUBLICATIONS

Pimenta S et al: "Recycling Carbon Fibre Reinforced Polymers for Structural Applications: Technology Review and Market Outlook". Waste Management, Elsevier, New York, NY, US, vol. 31, No. 2, Feb. 1, 2011.
International Searching Authority, Notification of Transmittal of the International Search Report and the Written Opinion of the International Searching Authority, or the Declaration, for Application No. in PCT/EP2013/075862, mailed Mar. 17, 2014.
European Patent Office, European Search Report for European Patent Application No. 12196116.3 mailed May 13, 2014.
The Peoples Republic of China, Chinese Office Action for Chinese Patent Application No. 201380063607.8 mailed Feb. 19, 2016.

* cited by examiner

*Primary Examiner* — Terressa Boykin
(74) *Attorney, Agent, or Firm* — Lorenz & Kopf, LLP.

(57) ABSTRACT

Disclosed is a method and an apparatus for extracting a long fiber, and in particular an endless fiber, embedded in a resin matrix forming a wound composite part, wherein the fiber is extracted as one single part by unwinding after a pyrolisis treatment for a decomposition of the matrix.

18 Claims, 6 Drawing Sheets

METHOD AND APPARATUS FOR EXTRACTING A FIBER OF A WOUND COMPOSITE PART

CROSS-REFERENCE TO RELATED APPLICATIONS

This application is a continuation of co-pending U.S. patent application Ser. No. 13/685,992 filed Nov. 27, 2012, which is a continuation of International Application No. PCT/EP2013/075862, filed Dec. 6, 2013, which application claims priority to European Patent Application No. 12196116.3, filed Dec. 7, 2012, and of U.S. Provisional Application No. 61/734,388 filed Dec. 7, 2012, which are hereby incorporated by reference in their entirety.

TECHNICAL FIELD

The embodiments described herein concern a method for extracting a fiber embedded in a resin matrix forming a wound composite part having a main axis, wherein the fiber forms a multiplicity of adjacent winding turns in the direction of the main axis, and an apparatus in particular for performing such a method.

According to a known method, fibre composite parts are crushed and sorted according to their state of processing and their fiber types, such as dry carbon fiber scraps, prepreg materials and end of life parts. Then, the crushed and sorted composite parts are exposed to a pyrolisis treatment. As a result of the pyrolisis treatment, the matrix is dissolved and thus the fibers are released from the matrix. The crushed fibers can then be used for building up a new composite part, in particular a non-structural composite part.

The embodiments described herein specify a method for extraction of a fiber embedded in a resin matrix forming a wound composite part. Furthermore, it is an object of the embodiments to create an apparatus for extracting a fiber embedded in a resin matrix forming a wound composite part and in particular for performing the method.

A method for extracting a fiber embedded in a resin matrix forming a wound composite part having a main axis, wherein the fiber forms a multiplicity of adjacent winding turns in the direction of the main axis, comprises the steps: positioning the composite part on a retainer extending in the direction of the main axis, creating a resin free fiber structure by pyrolisis treatment, supporting the fiber structure by a supporting pressure directing from the inside to the outside of the fiber structure, locating and grabbing a free end of the fiber, and unwinding the fiber.

The method according to the embodiments enables a recycling of long fibers embedded in a wound composite part. The fibre, for example carbon fibre, glass fibre and Aramid® fibre, can then be reused for winding a new composite part and in particular a structural part.

Advantageously, in order to avoid a mixing and in particular an entangling of the winding turns during the pyrolisis treatment, the composite part is aligned horizontally. Additionally, it is preferred when the composite part is supported over its entire length on the retainer. After the decomposition of the matrix, the winding turns can lay adjacent to each on the retainer in their original orientation.

In order to reduce the cycle time for extracting the fibre, the pyrolisis can be done continuously.

In one embodiment, in order to support the fiber structure by unwinding the fibre, a core element for creating the supporting pressure is positioned in the fibre structure along the main axis before the removal of the retainer. This embodiment enables a reliable position of the core element inside the fibre structure.

In an alternative embodiment, a core element for creating the supporting pressure is positioned in the fibre structure along the main axis, wherein the removal of the retainer and the supporting of the fibre structure by the core element are done simultaneously. Compared to the aforementioned embodiment, the alternative embodiment enables a faster positioning of the core element inside the fibre structure as the positioning of the core element and the removal of the retainer are done in one step.

According to one embodiment, the locating and grabbing of the free end of the fiber structure is done by electric charging. Hereby, a potential difference is applied to the fibre structure and to a grabber which enables a reliable and fast locating of the free end.

According to an alternative embodiment, the locating and grabbing of the free end of the fiber structure is done by rotating the fiber structure around the main axis, which is easy to perform.

According to the embodiments, an apparatus for extracting a fiber embedded in a resin matrix forming a wound composite part having a main axis, wherein the fiber forms a multiplicity of adjacent winding turns in the direction of the main axis, in particular for performing the inventive method, comprises a retainer for receiving the composite part, a furnace for carrying out a pyrolisis treatment for creating a resin free fiber structure, an expendable core element for supporting the fiber structure, a means for locating and grabbing a free end of the fiber, and a bobbin for receiving the unwound fiber.

Preferably, the retainer has an outer fixation mechanism for fixing the composite part in a first position and an inner fixation mechanism for fixing the composite part in a second position. Hereby, the composite part is supported on at least two positions which preferably are spaced apart from each other.

Advantageously, the inner fixation mechanism is incorporated in a retainer head and is expandable in the direction of the main axis. By this means, the extension of the retainer is enhanced in the direction of the main axis. Hereby, even the winding turns being located in front of a retainer head are supported after the pyrolisis treatment as the fixation mechanism can penetrate the dissolving matrix.

In order to position the core element inside the fiber structure, a retainer can have a cavity for receiving the core element.

In order to enable a removal of the retainer through the winding turns of the fibre structure, the retainer head can be conically shaped.

Alternatively, the retainer head has a front opening for releasing the core element. By this means in order to position the core element inside the fibre structure, the retainer can be moved backwards, thus preventing a shifting of the fibre structure winding turns.

In order to locate and grab a free end of the fiber by electrical charging, the means for locating and grabbing the free end of the fiber can comprise an electrical energy source for providing direct current, a moveable grabber and wiring for connecting the mandrel and the grabber with the energy source.

Alternatively, in order to locate and grab the free end of the fiber by rotation, the means for locating and grabbing the free end can comprise a drive mechanism for rotating the core element around the main axis and a grabber positioned outside of the fiber structure.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the disclosed embodiments or the application and uses thereof. Furthermore, there is no intention to be bound by any theory presented in the preceding background detailed description.

In the following Figs., a method and an apparatus for extracting a long fiber 1, in particular endless fibre 1, embedded in a resin matrix 2 forming a wound composite part 4 having a main axis m is shown, wherein the fiber 1 forms a multiplicity of adjacent winding turns in the direction of the main axis m.

Figure 1A:
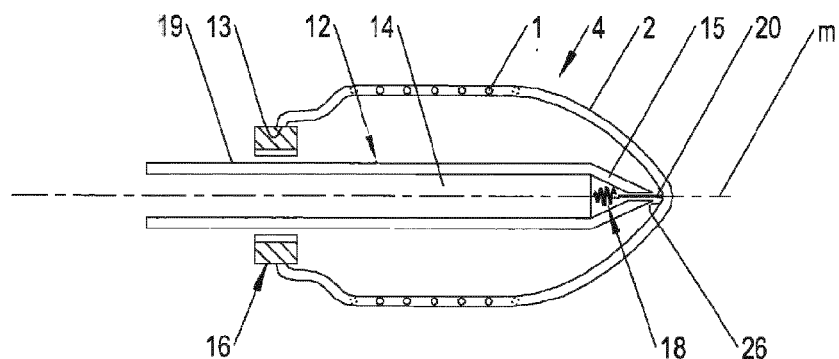
FIG. 1A shows a positioning of a composite part on one embodiment of a retainer.
Figure 1B:
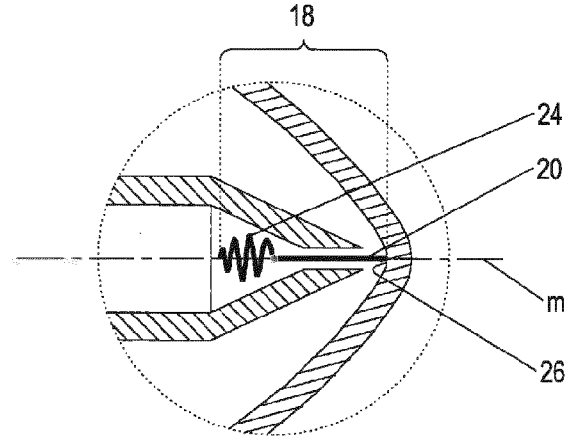
FIG. 1B is an enlarged view of an inner fixation mechanism shown in FIG. 1A.
Figure 7A:
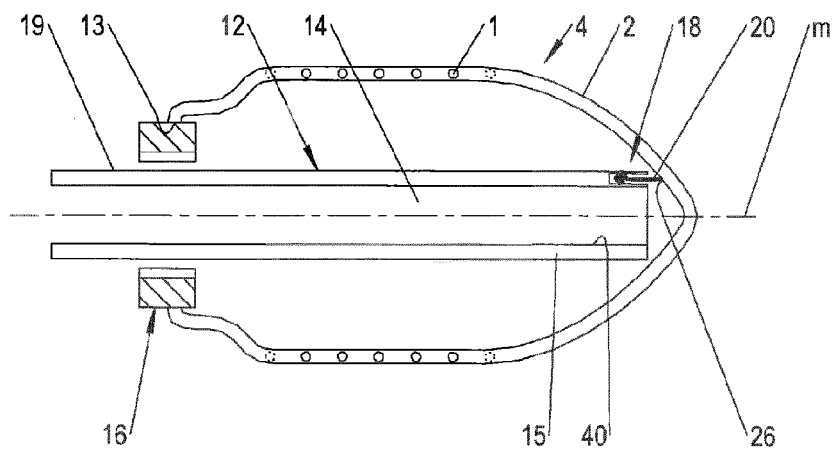
FIG. 7A shows a positioning of a composite part on an alternative embodiment of the retainer.
Figure 7B:
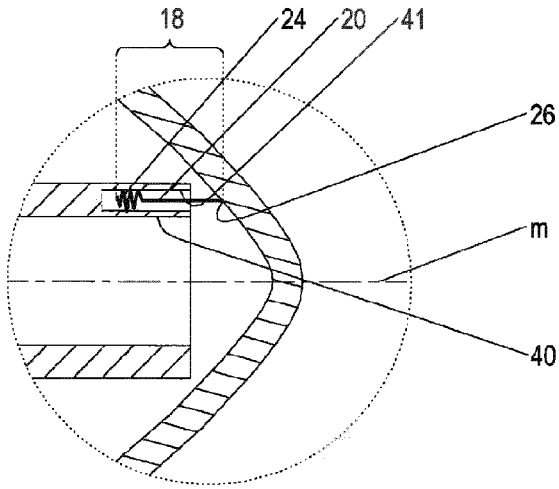
FIG. 7B is an enlarged view of an inner fixation mechanism shown in FIG. 7A.
Figure 8:
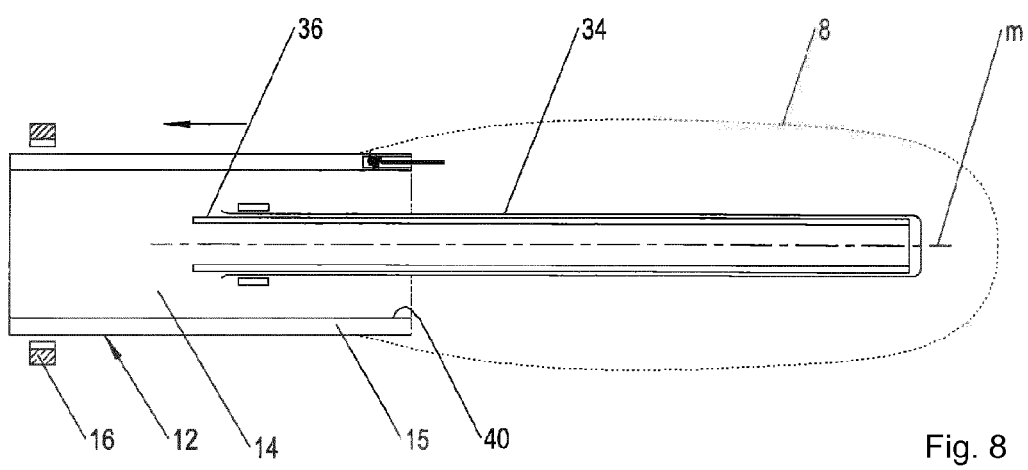
FIG. 8 shows a positioning of a core element inside the fiber structure via the alternative retainer.
Figure 9:
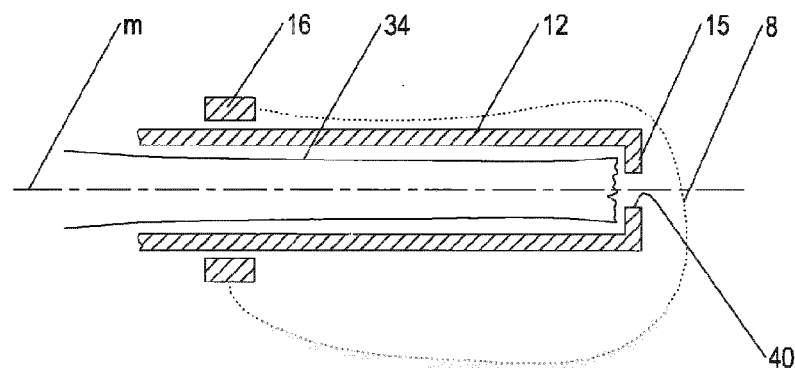
FIGS. 9 and 10 show positioning of a core element inside the fiber structure via a further embodiment of the retainer.
Figure 10:
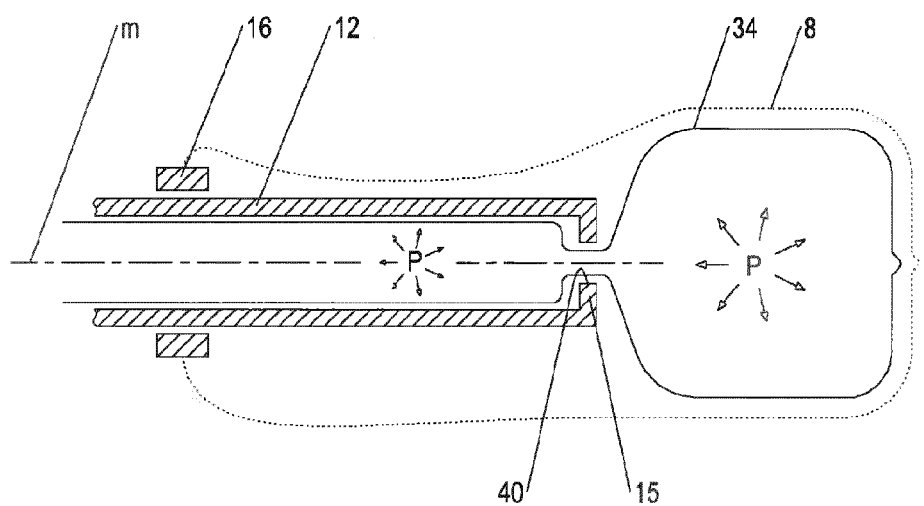
Figure 11:
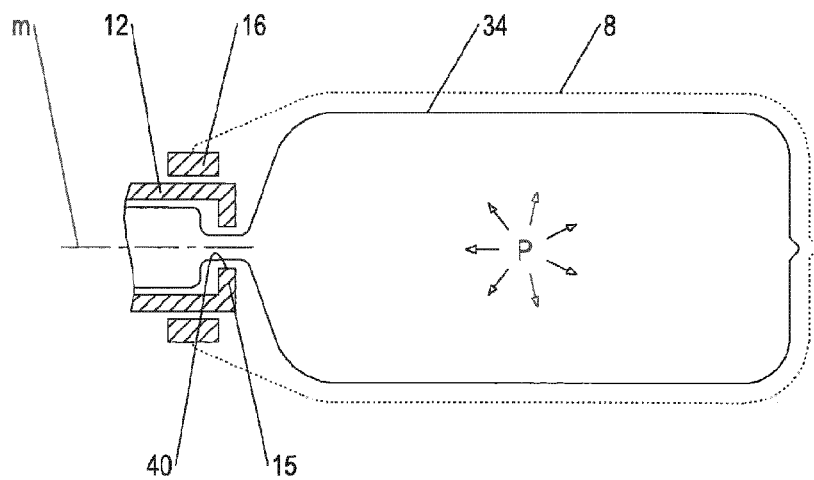
FIG. 11 shows a support of the fiber structure based on the core element shown in FIGS. 7 and 8.
Figure 15:
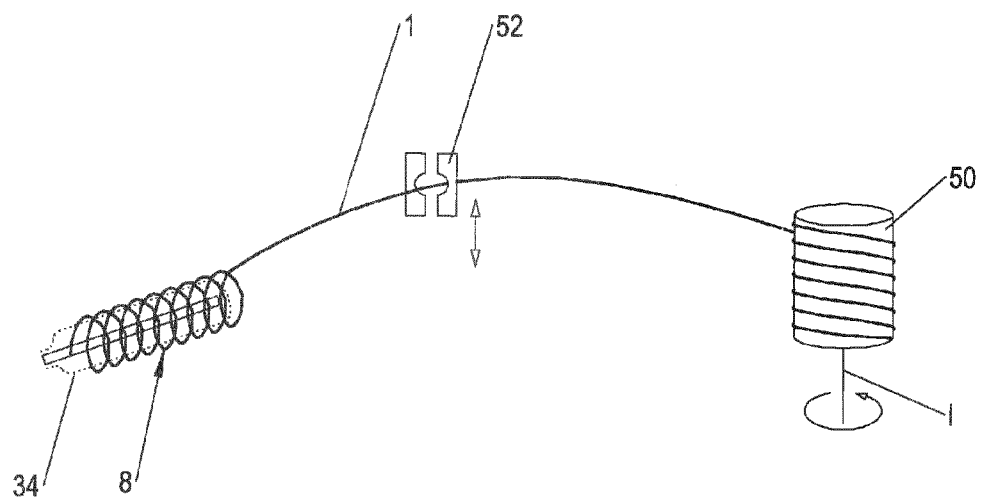
FIG. 15 shows a step of unwinding the fiber from the core element and its storing on a bobbin.
Figure 16:
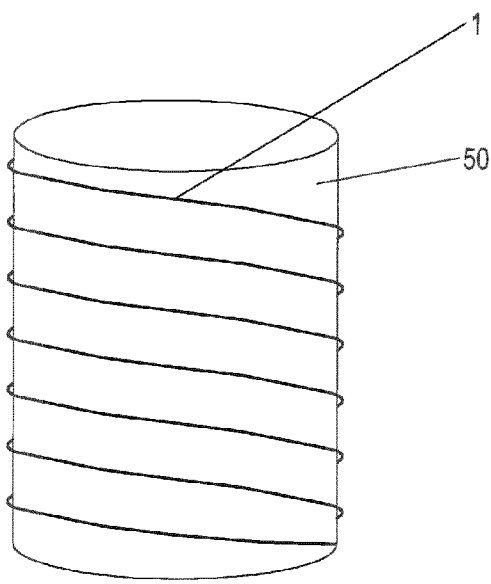
FIG. 16 shows the unwound fibre stored on the bobbin.

Major steps of the method are positioning the composite part 4 (FIGS. 1A and 1B; FIGS. 7A and 7B), creating a resin free fiber structure 8 (FIGS. 2 and 3), supporting the fiber structure 8 after a pyrolisis treatment (FIGS. 4, 5 and 6; FIG. 8; FIGS. 9, 10 and 11), locating and grabbing a free fiber end 10 of the fibre 1 (FIGS. 12, 13 and 14), and unwinding the fiber 1 (FIGS. 15 and 16).

Firstly, as shown in FIG. 1A the composite part 4 is positioned horizontally on a retainer 12 extending in the direction of the main axis m. The exemplary shown composite part 4 has a cup-like shape with one opening 13 through which the retainer 12 is inserted into it. The fibre 1 is a carbon fibre and the matrix 2 is made from a thermosetting resin, for instance.

The retainer 12 is in the shown embodiment a mandrel having a cylindrical hollow body forming a cavity 14, and a conically shaped head 15. The retainer 12 has an extension in the direction of the main axis m that correspondent to the length of the composite part 4. Thus, the composite part 4 is carried on the retainer 12 over its entire length. Further on, the retainer 12 has an outer fixation mechanism 16 and an inner fixation mechanism 18.

The cavity 14 is used for receiving an expandable core element 34 (shown in FIGS. 4 to 9). The cavity 14 is opened at a rear end 19 of the retainer 12 and is closed at the retainer head 15.

The outer fixation mechanism 16 is positioned in a distance to the retainer head 15 at the rear end 19 of the retainer 12. It comprises at least 1 clamping element for fixing the composite part 4 to an outer area of the retainer 12.

As shown in detail in FIG. 1B, the inner fixation mechanism 18 is integrated partially in the retainer head 15 and thus positioned in a distance to the outer fixation mechanism 16. The inner fixation mechanism 18 comprises in the shown embodiment a needle-like pin 20 that is fed out of the head 15 in the direction of the main axis m. The pin 20 is biased by a spring 24 which is positioned inside the head 15 in a direction away from the retainer 12. By means of the spring 24, the fixation means 18 works fully automatically without any external manual support As illustrated in FIGS. 1A and 1B, the pin 20 is pressed against an inner surface face 26 of the composite part 4, whereby the spring 24 is loaded. By this means, during the pyrolisis treatment, the needle 20 penetrates the composite part 4 and support winding turns 27 (FIG. 3) of the received fibre structure 8 in an area before the retainer head 15. By means of the pin 20, the length of the retainer 12 is increased.

Figure 2:
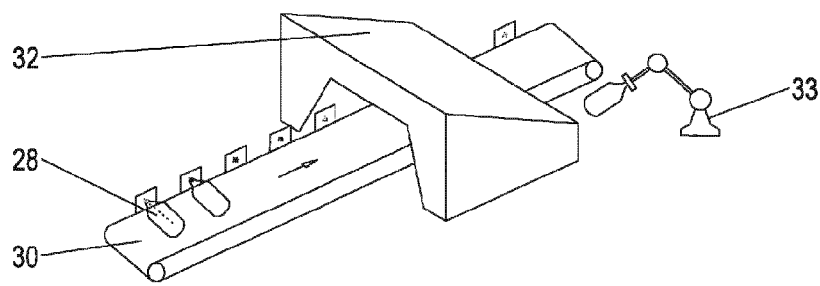
FIG. 2 is a perspective view of a furnace and of a belt for feeding several composite parts to the furnace for performing a pyrolisis treatment.
Figure 3:
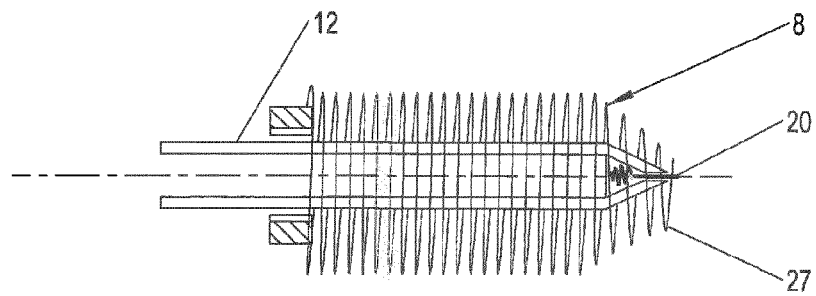
FIG. 3 shows a fiber structure of the composite part positioned on the retainer after the pyrolisis treatment.

Secondly, as shown in FIGS. 2 and 3 the composite part 4 positioned on the retainer 12 is exposed to the pyrolisis treatment for the purposes of creating the resin free fibre structure 8. Basically, pyrolisis is a chemical decomposition process at elevated temperatures without the participation of oxygen. As a result of the pyrolisis treatment, the matrix 2 is removed from the fiber 1.

As shown in FIG. 2, the retainer 12 provided with the composite part 4 is attached to a holding means 28 of a belt 30. The belt 30 is continuously fed through a furnace 32 for performing the pyrolisis treatment. In order to treat a multiplicity of composite parts 4 continuously, the belt 30 covers a plurality of holding means 28 for receiving a retainer 12 provided with the composite part 4 each. As illustrated by the robot 33, the handling of the composite parts 4 can be done fully automatically.

As shown in FIG. 3, after the pyrolisis treatment, the resin free fiber structure 8 rests on the retainer 12 and the pin 20. Due to the horizontal alignment of the resin free fibre structure 8 the winding turns are not mixed up, but are in their original alignment to each other.

Thirdly, as shown in FIGS. 5 to 9, in order to prepare the fiber structure 8 for its unwinding, the fiber structure 8 is supported by a supporting pressure p directing from the inside to the outside of the fiber structure 8. The supporting pressure p is applied by the aforementioned expandable core element 34. Preferably, the core element 34 is an inflatable cylindrical pressure bag connected to a pressure source. In order to support the fibre structure 8 over its entire length, the core element 34 has a length that corresponds to the length of the fibre structure 8.

Figure 4:
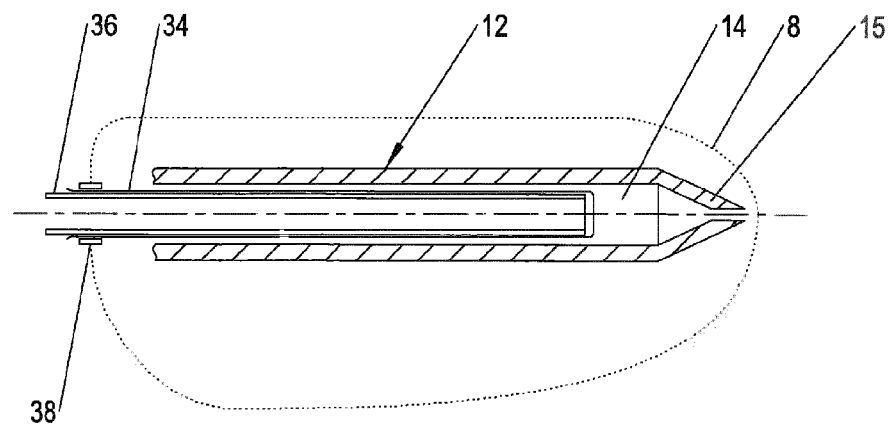
FIGS. 4 and 5 show a positioning of a core element inside the fiber structure.

According to one embodiment shown in FIG. 4, the core element 34 is inserted in the cavity 14 of the retainer 12 via an auxiliary means 36 at its rear end 19. In the shown embodiment, the auxiliary means 36 is a pipe that is in fluid connection with a pressure source. The core element 34 is slit on the auxiliary means 36 and pressure-tight fixed to it by a clamping means 38.

Figure 5:
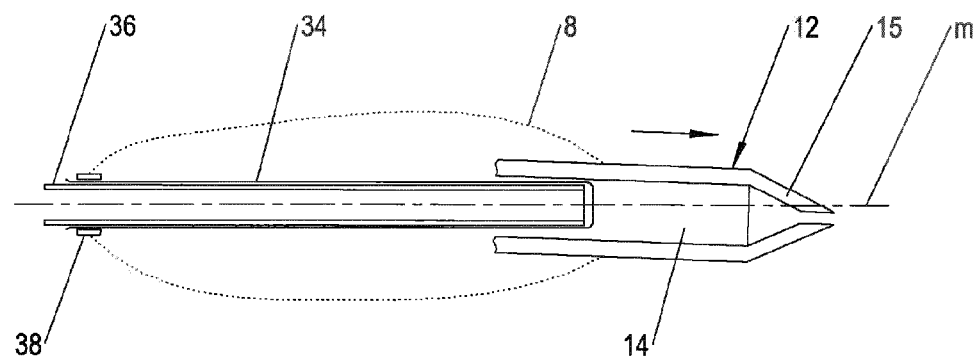

As shown in FIG. 5, after the expandable core element 34 has been introduced in the cavity 14 the retainer 12 is removed from the inside from the fiber structure 8. The outer fixation mechanism 16 is released and the retainer 12 is moved forward in the direction of the main axis m and thus through the fibre structure 8. Due to its conical head 15, a misalignment or shifting of the winding turns of the fibre structure 8 by the penetrating retainer 12 is avoided.

Figure 6:
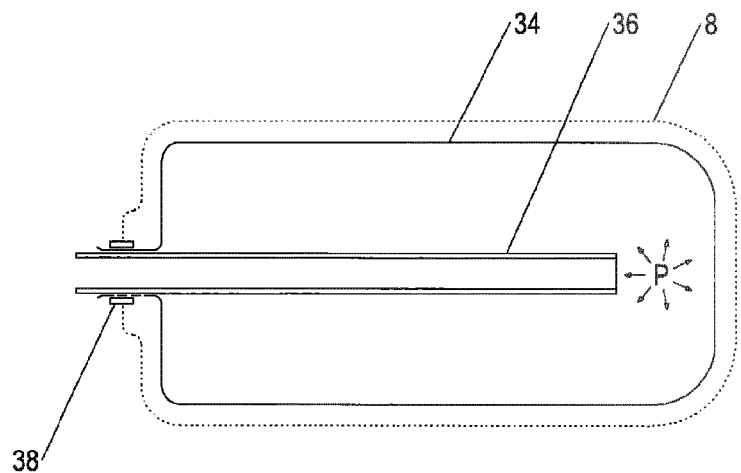
FIG. 6 shows a support of the fiber structure by the core element.

As shown in FIG. 6, after the retainer 12 has been removed, the fibre structure 8 is preferably clamped by the clamping means 38 and the core element 34 is expanded until the fibre structure 8 is "pumped-up" by the core element 34 such that its winding turns are stabilized.

In FIGS. 7A and 7B an alternative embodiment of a retractable retainer 12 for positioning a composite part 4 is shown.

Contrary to the aforementioned retainer, the retractable retainer 12 has a cylindrical head 15. The cavity 14 extends through the head 15 and is widely opened by a front opening 40. The front opening 40 has an inner diameter that is greater than the outer diameter of the auxiliary means 36 provided with the core element 34.

Further on, in contrast to the aforementioned retainer and shown in detail in FIG. 7B, an inner fixation mechanism 18 that also comprises a spring biased needle-like pin 20 is located lateral to the main axis in a front recess 41 of the retainer 12. As already explained in FIGS. 1A, 1B, and 2, in a mounted stated of the composite part 4 on the retainer 12, the pin 20 is pressed against an inner surface face 26 of the composite part 4, whereby the spring 24 is loaded. By this means, during the pyrolisis treatment, the needle 20 penetrates the composite part 4 and support winding turns 27 (FIG. 2) of the received fibre structure 8 in an area before the retainer head 15.

In order to support the fibre structure 8 by means of the core element 34, primarily, the core element 34 is inserted in the cavity 14 via the auxiliary means 36 at the rear end 19 of the retainer 12. Then, the outer fixation means 16 is released and, in contrast to the aforementioned embodiment shown in FIGS. 1A, 1B, and 2, the retainer 12 is removed from the inside from the fiber structure 8 by a retraction along the main axis m. The retainer 1 is moved backwards, thus releasing the core element 34 through the front opening 41 into the inside of the fibre structure 8. After the removal of the retainer 12, the fibre structure 8 is preferably clamped by the clamping means 38 of the auxiliary means 36.

In FIGS. 9, 10, and 11 an embodiment of positioning the core element 34 inside the fibre structure 8 is shown, by which the decomposition of the retainer 12 and the applying of the supporting pressure p is done simultaneously.

According to this alternative embodiment, a retractable retainer 12 has at its cylinder-like head 15 a small front opening 40 for inserting the core element 34 inside the fiber structure 8. The core element 34 is an inflatable bag that is positioned in the cavity 14 in a relaxed state without being carried by an auxiliary means 36 shown in FIG. 4, for instance.

In order to support the fiber structure 8 by the core element 34, the retainer 12 is moved backwards while simultaneously the core element 34 is pressurized and thus exits the cavity 14 through the front opening 40 into the fiber structure 8. As in this embodiment the retainer 12 is retracted, the fibre structure 8 can remain fixed in the outer fixation mechanism 16.

Figure 12:
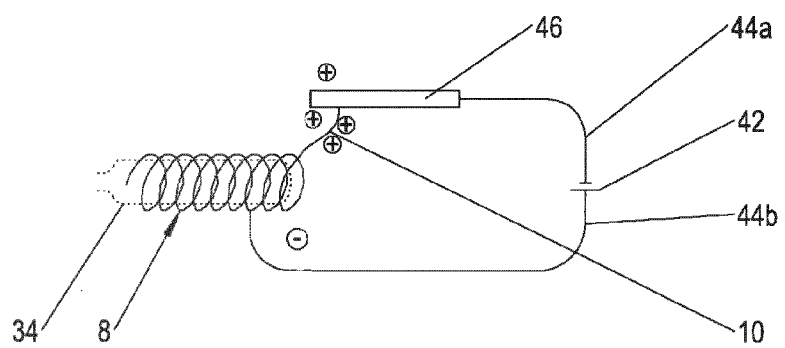
FIG. 12 shows a first embodiment of a means for locating and grabbing a free end of the fiber.
Figure 13:
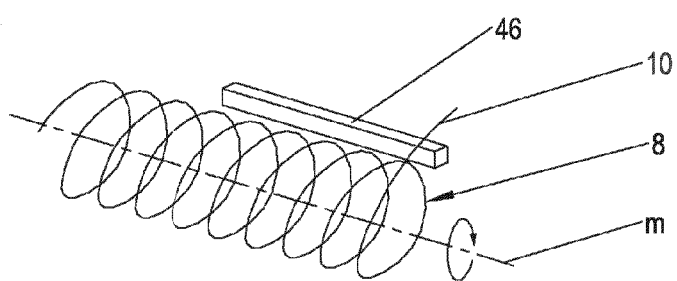
FIG. 13 shows a second embodiment of a means for locating and grabbing the free end of the fiber structure.

Fourthly, as illustrated in FIGS. 12 and 13, the free fibre end 10 of the fibre structure 8 is located and grabbed.

According to a first embodiment shown in FIG. 12, the locating and grabbing of the free fiber end 10 is done by electrical charging. For this, a means for locating and grabbing the free fiber end 10 has an energy source 42 providing direct current, a wiring 44a, 44b and a grabber 46. By means of the wiring 44a, 44b, the energy source 42 is electrically connected with the fiber structure 8 and with the grabber 46, respectively. Preferably, the fiber structure 8 is charged negatively, while the grabber 46 is charged positively. As a consequence of the potential difference between the fiber structure 8 and the grabber 46, the fiber free end 10 is drawn to the grabber 46 and lifted from the fibre structure 8 if the grabber 46 is narrowed.

In an alternative embodiment, shown in FIG. 13, the free fiber end 10 is grabbed by centrifugal effects. For this, a means for locating and grabbing the free fiber end 10 has a not shown drive mechanism, for rotating the core element 34 and thus the fiber structure 8 around the main axis m. Further on, the means for locating and grabbing has a grabber 46 for catching the free fibre end 10 positioned outside of the fibre structure 8. By rotating the fiber structure 8, the free fiber end 10 is forced to the outside of the fiber structure 8, where it is caught by the grabber 46.

Figure 14:
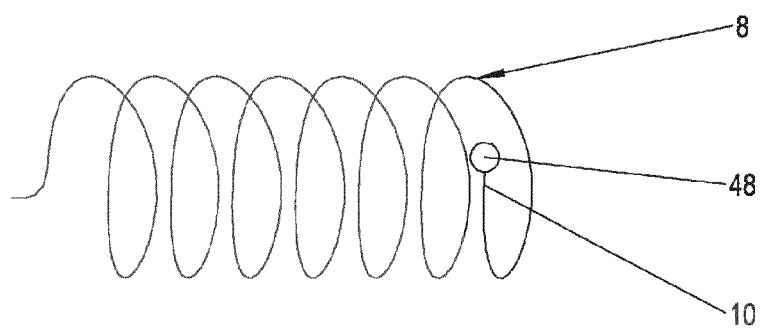
FIG. 14 shows a visual marking on a free end of the fiber.

As shown in FIG. 14, in order to locate the free fibre end 10 just by a visual inspection, the free fiber end 10 can be provided with a thermal- and chemical resistant visual marking 48. For instance, the marking 48 is made from ceramic or from cement and has a colour that is different to the colour of the fibre 1. By this means, the free fiber end 10 can be located without the need of electrical charging or rotating of the fiber structure 8.

Fifthly, as shown in FIG. 15 the fiber 1 is unwound and thereby transferred to a bobbin 50 for a reuse or for a further treatment.

The fiber free end 10 is clamped on the bobbin 50 and then unwound by a rotational movement of the bobbin 50 around its longitudinal axis 1. In order to wind the fiber 1 up over the entire length on the bobbin 50, a guiding means 52 for guiding the fiber 1 in direction in the longitudinal axis 1 is provided. The core element 34 is fixed during the unwinding and winding process.

Additionally, a post treatment of the fiber 1 can be conducted before it is wind up on the bobbin 50. For example, a coating such as a blackening can be applied to the fiber 1 for thermosetting applications by the guiding means 52.

Finally, as shown in FIG. 16, the fiber 1 is removed from the composite part 4 and prepared as one single unshortened fibre 1 for a reuse in a new structural part on a bobbin 50.

Disclosed is as a method and an apparatus for extracting a long fibre, and in particular an endless fiber, embedded in a resin matrix forming a wound composite part, wherein the fiber is extracted as one single part by unwinding after a pyrolisis treatment for a decomposition of the matrix.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for extracting a fibre embedded in a resin matrix forming a wound composite part having a main axis, wherein the fibre forms a multiplicity of adjacent winding turns in the direction of the main axis, comprising the steps:
    positioning the composite part on a retainer extending in the direction of the main axis,
    creating a resin free fibre structure by pyrolisis treatment,
    supporting the fibre structure by a supporting pressure directing from the inside to the outside of the fibre structure,
    locating and grabbing a free end of the fibre, and
    unwinding the fibre.

2. The method in accordance with claim 1, wherein the composite part is aligned horizontally.

3. The method in accordance with claim 1, wherein the pyrolisis is done continuously.

4. The method in accordance with claim 1, wherein a core element for creating the supporting pressure (p) is positioned in the fibre structure along the main axis (m) before the removal of the retainer.

5. The method in accordance with claim 1, wherein a core element for creating the supporting pressure (p) is positioned in the fibre structure along the main axis (m), wherein the removal of the retainer and the supporting of the fibre structure by the core element are done simultaneously.

6. The method in accordance with claim 1, wherein the locating and grabbing of the free end of the fibre is done by electric charging.

7. The method in accordance with claim 1, wherein, the locating and grabbing of the free end of the fibre is done by rotating the fibre structure around the main axis.

8. An apparatus for extracting a fibre embedded in a resin matrix forming a wound composite part having a main axis, wherein the fibre forms a multiplicity of adjacent winding turns in the direction of the main axis, in particular for performing a method according to one of the preceding claims, comprising:
    a retainer for receiving the composite part,
    a furnace for carrying out a pyrolisis treatment for creating a resin free fibre structure,
    an expandable core element for supporting the fibre structure,
    a means for locating and grabbing a free end of the fibre, and
    a bobbin for receiving the unwound fibre.

9. The apparatus in accordance with claim 8, wherein the retainer has an outer fixation mechanism for fixing the composite part in a first position and an inner fixation mechanism for fixing the composite part in a second position.

10. The apparatus in accordance with claim 9, wherein the inner fixation mechanism is incorporated in a retainer head and is expandable in the direction of the main axis.

11. The apparatus in accordance with claim 8, wherein the retainer has a cavity for receiving the core element.

12. The apparatus in accordance with one of claim 8, wherein the retainer head is conically shaped.

13. The apparatus in accordance with one of claim 8, wherein the retainer head has a front opening for releasing the core element.

14. The apparatus in accordance with of claim 8, wherein the means for locating and grabbing the free end of the fibre comprises an electrical energy source for providing direct current, a movable grabber and wiring for connecting the retainer and the grabber with the energy source.

15. The apparatus in accordance with of claim 8, wherein the means for locating grabbing the free end of the fibre comprises a drive mechanism for rotating the core element around the main axis and a grabber positioned outside of the fibre structure.

16. A method for extraction a fibre embedded in a resin matrix forming a wound composite part having a main axis, wherein the fibre forms a multiplicity of adjacent winding turns in the direction of the main axis, comprising the steps:
    positioning the composite part on a retainer extending in the direction of the main axis,
    creating a resin free fibre structure by pyrolisis treatment,
    supporting the fibre structure by a supporting pressure directing from the inside to the outside of the fibre structure,
    locating and grabbing a free end of the fibre, and
    unwinding the fibre,
    wherein the composite part is aligned horizontally,
    wherein the pyrolisis is done continuously.

17. A method for extraction a fibre embedded in a resin matrix forming a wound composite part having a main axis, wherein the fibre forms a multiplicity of adjacent winding turns in the direction of the main axis, comprising the steps:
    positioning the composite part on a retainer extending in the direction of the main axis,
    creating a resin free fibre structure by pyrolisis treatment,
    supporting the fibre structure by a supporting pressure directing from the inside to the outside of the fibre structure,
    locating and grabbing a free end of the fibre, and
    unwinding the fibre,
    wherein the composite part is aligned horizontally,
    wherein the pyrolisis is done continuously,
    wherein a core element for creating the supporting pressure (p) is positioned in the fibre structure along the main axis (m) before the removal of the retainer,
    wherein a core element for creating the supporting pressure (p) is positioned in the fibre structure along the main axis (m), wherein the removal of the retainer and the supporting of the fibre structure by the core element are done simultaneously.

18. A method for extraction a fibre embedded in a resin matrix forming a wound composite part having a main axis, wherein the fibre forms a multiplicity of adjacent winding turns in the direction of the main axis, comprising the steps:
    positioning the composite part on a retainer extending in the direction of the main axis,
    creating a resin free fibre structure by pyrolisis treatment,
    supporting the fibre structure by a supporting pressure directing from the inside to the outside of the fibre structure,
    locating and grabbing a free end of the fibre, and
    unwinding the fibre,
    wherein the composite part is aligned horizontally,
    wherein the pyrolisis is done continuously,
    wherein a core element for creating the supporting pressure (p) is positioned in the fibre structure along the main axis (m) before the removal of the retainer,
    wherein a core element for creating the supporting pressure (p) is positioned in the fibre structure along the main axis (m), wherein the removal of the retainer and the supporting of the fibre structure by the core element are done simultaneously,
    wherein the locating and grabbing of the free end of the fibre is done by electric charging, wherein, the locating and grabbing of the free end of the fibre is done by rotating the fibre structure around the main axis.

* * * * *